(12) United States Patent
Jiang (10) Patent No.: US 8,760,077 B2
(45) Date of Patent: Jun. 24, 2014

(54) PLANT ILLUMINATION APPARATUS

(71) Applicants: Lextar Electronics Corp., Hsinchu (TW); Lextar Electronics Corporation, Suzhou Industrial Park (CN)

(72) Inventor: Jin-Yong Jiang, Suzhou Industrial Park (CN)

(73) Assignees: Lextar Electronics Corp., Hsinchu (TW); Lextar Electronics Corporation, Suzhou Industrial Park (CN)

( * ) Notice: Subject to any disclaimer, the term of this patent is extended or adjusted under 35 U.S.C. 154(b) by 22 days.

(21) Appl. No.: 13/689,111

(22) Filed: Nov. 29, 2012

(65) Prior Publication Data

US 2013/0162147 A1    Jun. 27, 2013

(30) Foreign Application Priority Data

Dec. 27, 2011 (CN) .......................... 2011 1 0442949

(51) Int. Cl.
*H05B 37/02* (2006.01)

(52) U.S. Cl.
USPC ........... 315/294; 315/297; 315/307; 315/309; 315/312; 315/360; 362/227; 362/231

(58) Field of Classification Search
CPC .... H05B 37/02; H05B 37/0218; A01G 7/045; Y02B 20/46
USPC ......... 315/152, 154, 292, 294, 297, 307, 309, 315/312, 360, 362; 362/2, 227, 231, 249.02
See application file for complete search history.

(56) References Cited

U.S. PATENT DOCUMENTS

| | | | | |
|---|---|---|---|---|
| 6,166,496 | A | * | 12/2000 | Lys et al. .................... 315/316 |
| 7,382,454 | B1 | * | 6/2008 | Turner .......................... 356/416 |
| 8,523,385 | B2 | * | 9/2013 | Lu et al. ....................... 362/231 |
| 2013/0139437 | A1 | * | 6/2013 | Maxik et al. ............ 47/58.1 LS |

* cited by examiner

*Primary Examiner* — Haiss Philogene
(74) *Attorney, Agent, or Firm* — Muncy, Geissler, Olds & Lowe, P.C.

(57) ABSTRACT

A plant illumination apparatus includes a light source module including a first light source and a second light source generating lights having different wavelengths, an environment-detecting module detecting an external environment to obtain a real-time environment parameter, and a control module connected to the light source module and the environment-detecting module. The control module includes a processor unit and a storage unit storing a database of plant growing environment parameters. The processor unit loads at least one preset growing environment parameter corresponding to a plant growth timing from the database of plant growing environment parameters, and compares the preset growing environment parameter with the real-time environment parameter to output at least one comparison result. The processor unit adjusts the first light source and the second light source according to the comparison result, so that an adjusted environment parameter matches the preset growing environment parameter.

14 Claims, 4 Drawing Sheets

PLANT ILLUMINATION APPARATUS

BACKGROUND OF THE INVENTION

1. Field of the Invention

The present invention relates to a plant illumination apparatus. Particularly, the present invention relates to a plant illumination apparatus for indoor plant cultivation or agriculture.

2. Description of the Prior Art

Environmental factors that affect plant growth include sun, water, and air. In modern society, the agriculture industry is growing vigorously in response to the fast advance in technology. For example, one may spray water manually in the past, but now a sprinkle device can spray water at a predetermined time under the control of electronic timing devices. Besides, the growth of plant requires an ideal environmental temperature. As a result, if the weather is overcast, fruit farmers shall turn on warm light sources to provide an environment with ideal temperature for plant growth.

However, the weather is much more unstable recently, so that the traditional illumination device cannot provide plants with a better environment. Furthermore, the traditional illumination device cannot automatically adjust light sources immediately based on environment parameters (such as temperature, luminous, and humidity) and thus plant cannot grow faster.

Besides, the traditional illumination device provides light sources with a specific wavelength and cannot effectively integrate a plurality of light sources with different wavelengths. Particularly, plants are more susceptible to receiving light with wavelength between 400-500 nm in a low temperature environment and receiving light with wavelength between 600-700 nm in a high temperature environment. In an environment having a high variation in temperature, the traditional illumination device still provides light with only one specific wavelength that cannot provide suitable light for plant growth and cannot control lights based on the change in temperature. In other situations, traditional illumination devices cannot solve problems mentioned above and cannot produce proper lighting effect on different plants.

SUMMARY OF THE INVENTION

In view of aforementioned problems in prior arts, the present invention provides a plant illumination apparatus that can detect environment parameters and adjust illumination automatically.

In one aspect, the present invention provides a plant illumination apparatus having an environment-detecting module to adjust the illumination effect based on environment conditions.

In one aspect, the present invention provides a plant illumination apparatus capable of adjusting light according to a real-time parameter and producing an effect on promoting plant growth.

In one aspect, the present invention provides a plant illumination apparatus, which can selectively control light sources to save energy.

A plant illumination apparatus of the present invention includes a light source module, an environment-detecting module, and a control module. The light source module includes a first light source for generating light having a first wavelength (i.e. the first wavelength light) and a second light source for generating light having a second wavelength (i.e. the second wavelength light). The environment-detecting module detects an external environment to obtain a real-time environment parameter. The control module is connected to the light source module and the environment-detecting module. The control module includes a processor unit and a storage unit for storing a database of plant growing environment parameters.

It is noted that the processor unit obtains at least one preset growing environment parameter corresponding to a plant growth timing from the database of plant growing environment parameters, and compares the preset growing environment parameter with the real-time environment parameter to output at least one comparison result. The processor unit adjusts the first light source and the second light source according to the comparison result, so that an adjusted environment parameter matches the preset growing environment parameter. In addition, the real-time environment parameter includes at least one of a real-time temperature, a real-time humidity, an environment first wavelength luminous flux, and an environment second wavelength luminous flux. The preset growing environment parameter includes at least one of a preset temperature range, a preset humidity, and a preset plant luminous parameter.

As an alternative scheme, the real-time environment parameter includes at least one of the real-time temperature, the environment first wavelength luminous flux, and the environment second wavelength luminous flux. The preset growing environment parameter includes the preset temperature range, a preset high temperature threshold value T3, and the preset plant luminous parameter, wherein the minimum value of the preset temperature range is T1 and the maximum value is T2, and T3>T2.

As an alternative scheme, the environment-detecting module includes a temperature detector, which detects an external environment to obtain a real-time temperature T.

As an alternative scheme, if the real-time temperature T is lower than T1, the control module activates the second light source of the light source module to generate light having the second wavelength and stops the first light source generating light having the first wavelength. If T2<T<T3, the control module activates the first light source of the light source module to generate light having the first wavelength and stops the second light source generating light having the second wavelength.

As an alternative scheme, the environment-detecting module includes a light detector, which detects an external environment to obtain the environment first wavelength luminous flux and the environment second wavelength luminous flux.

As an alternative scheme, the preset plant luminous parameter includes a first wavelength luminous flux parameter, a second wavelength luminous flux parameter, and the ratio of the first wavelength luminous flux parameter to the second wavelength luminous flux parameter.

As an alternative scheme, the preset first wavelength luminous flux parameter and the detected environment first wavelength luminous flux are compared by the processor unit to obtain a first wavelength luminous flux difference, and the preset second wavelength luminous flux parameter and the detected environment second wavelength luminous flux are compared by the processor unit to obtain a second wavelength luminous flux difference As an alternative scheme, when the first wavelength luminous flux difference is larger than or equal to 0, the processor unit stops the first light source of the light source module generating light having the first wavelength. When the first wavelength luminous flux difference is smaller than 0, the processor unit controls the first light source to generate light having the first wavelength for compensating the first wavelength luminous flux difference. When the second wavelength luminous flux difference is larger than or equal to 0, the processor unit stops the second light source of the light source module generating light having the second wavelength. When the second wavelength luminous flux difference is smaller than 0, the processor unit controls the second light source of the light source module to generate light having the second wavelength for compensating the second wavelength luminous flux difference.

As an alternative scheme, the preset plant luminous parameters are classified into groups based on different temperature range.

As an alternative scheme, the control module further includes a real-time clock unit to provide real time, and the control module can determine the corresponding plant growth timing based on the real time.

As an alternative scheme, the real-time environment parameter includes a real-time humidity. The preset growing environment parameter includes the preset humidity. The environment-detecting module includes a humidity detector, which detects an external environment to obtain the real-time humidity.

As an alternative scheme, the control module is connected to an external automatic sprinkler. When the real-time humidity is lower than the preset humidity, the control module outputs an activation signal to the external automatic sprinkler to spray water automatically.

As an alternative scheme, the plant illumination apparatus further includes a data input interface connected to the control module, and the preset growing environment parameter of the database of the plant growing environment parameters in the storage unit can be updated by an external command inputted through the data input interface.

As an alternative scheme, the first wavelength is between 600 nm and 700 nm and the second wavelength is between 395 nm and 500 nm.

Comparing to prior arts, the plant illumination apparatus of the present invention utilizes the environment-detecting module to obtain environment parameters.

The control module compares the environment parameters with the preset parameters of the database of plant growing environment parameters to control the first light source and the second light source for promoting plant growth. In practical applications, the plant illumination apparatus turns on or turns off the light sources based on the external environment to immediately adjust the illumination and effectively save energy, so that an ideal plant growth environment is provided.

The advantages and the features of the present invention will be described in the following description and will be learned in the drawings therewith.

DETAILED DESCRIPTION OF THE PREFERRED EMBODIMENT

Referring to one embodiment, the present invention provides a plant illumination apparatus to improve lighting. In this embodiment, the plant illumination apparatus may be an intelligent plant illumination apparatus.

Figure 1:
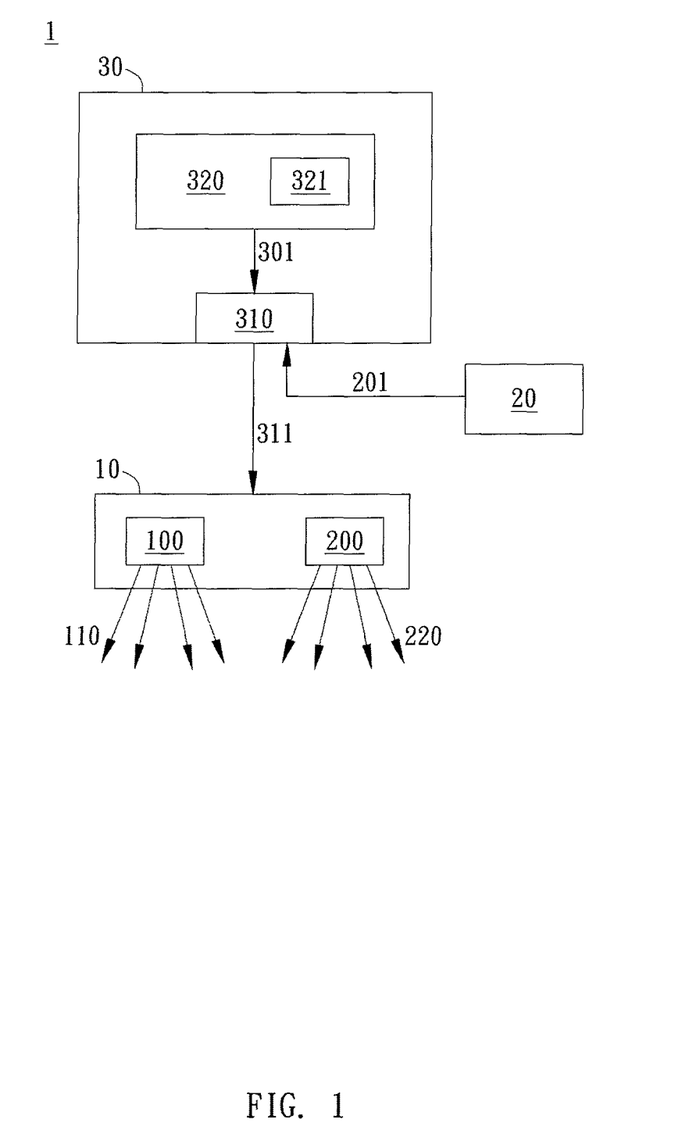
FIG. 1 is a schematic view of a first embodiment of the plant illumination apparatus.

Please refer to FIG. 1. FIG. 1 is a schematic view of a first embodiment of the plant illumination apparatus 1. In practical applications, the shape of the plant illumination apparatus includes spherical shape, rod shape, disc shape, or other geometrical shape without specific limitations. As shown in FIG. 1, the plant illumination apparatus 1 includes a light source module 10, an environment-detecting module 20, and a control module 30. The light source module 10 includes a first light source 100 for generating light having a first wavelength (i.e. a first wavelength light) 110 and a second light source 200 for generating light having a second wavelength (i.e. a second wavelength light) 220. That is, the first light source 100 emits light having the first wavelength 110 and the second light source 200 emits light having the second wavelength 220.

It is noted that the first wavelength 110 and the second wavelength 220 are different wavelengths between 300 nm and 800 nm in the range of visible light based on practical environment and plant situation. In this embodiment, the first wavelength 110 is between 600 nm and 700 nm and preferably between 620 nm and 690 nm. The second wavelength 220 is between 395 nm and 500 nm and preferably between 450 nm and 475 nm. In other words, the first wavelength 110 of the first light source 100 is, but not limited to, a red light source and the second wavelength 220 of the second light source 200 is, but not limited to, a blue light source.

Besides, the first light source 100 and the second light source 200 can be light emitting diodes, halogen light bulbs, or other light sources. In this embodiment, the first light source 100 and the second light source 200 are light emitting diodes. It is noted that the first light source 100 and the second light source 200 respectively include at least one light emitting diode. The exterior shape of the first light source 100 and the second light source 200 can be changed based on the arrangement of light emitting diodes.

In practical situations, many environment factors directly affect plant growth, such as temperature, humidity, wavelength of light, or seasonal variation. In this embodiment, the plant illumination apparatus 1 detects information of aforementioned parameters. Particularly, the environment-detecting module 20 obtains at least a real-time environment parameter 201 from detecting the environment. In this embodiment, the real-time environment parameter 201 includes a real-time temperature, a real-time humidity, an environment first wavelength luminous flux, an environment second wavelength luminous flux, or other parameters. It is noted that the environment first wavelength luminous flux and the environment second wavelength luminous flux respectively are the luminance (energy) of light having the first wavelength 110 and the luminance (energy) of light having the second wavelength 220, which are detected by the environment-detecting module 20. It is noted that from the detection of the environment-detecting module 20, the plant illumination apparatus 1 may obtain the real-time environment parameter 201 according to information of the aforementioned parameters to adjust lighting effect of the first light source 100 and the second light source 200.

As shown in FIG. 1, the control module 30 includes a processor unit 310 and a storage unit 320 and is connected to the light source module 10 and the environment-detecting module 20. The storage unit 320 stores a database of plant growing environment parameters 321. In practical applications, the processor unit 310 loads at least one preset growing environment parameter 301 required in a plant growth timing from the database of plant growing environment parameters 321, and then compares the preset growing environment parameter 301 with the real-time parameter 201 to output at least one comparison result 311. The comparison result 311 is then utilized to adjust the first light source 100 and the second light source 200, so that the adjusted environment parameters will be consistent to the preset growing environment parameter 301. For example, plant requires different luminance under different ambient temperatures in four seasons. The plant illumination apparatus 1 can produce the comparison result 311 by means of the control module 30 and adjust the first light source 100 and the second light source 200.

Figure 2:
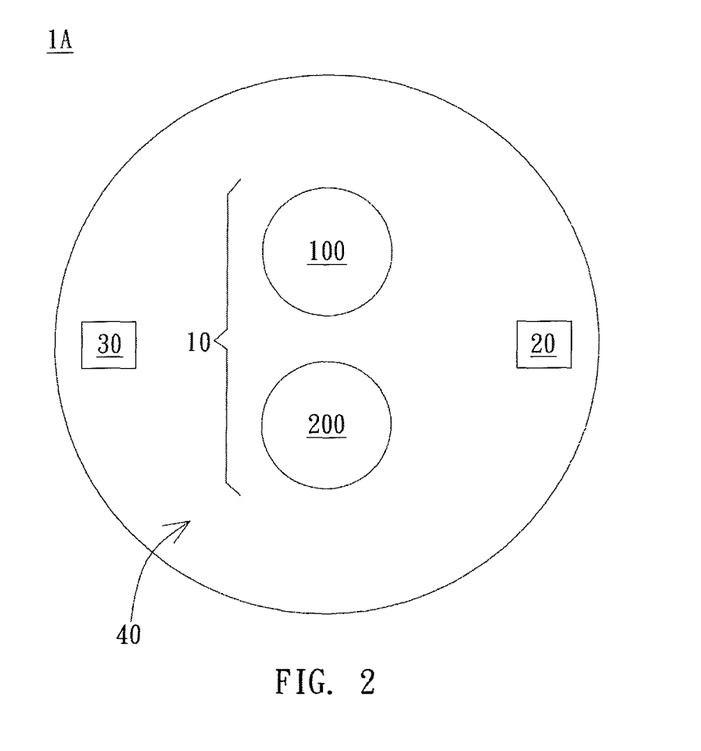
FIG. 2 is a top view of the first embodiment of the plant illumination apparatus.

Please refer to FIG. 2. FIG. 2 is a top view of the first embodiment of the plant illumination apparatus. As shown in FIG. 2, in this embodiment, the plant illumination apparatus 1A includes a reflective lamp housing 40, wherein the reflective surface of the reflective lamp housing 40 faces the first light source 100 and the second light source 200 for reflecting light from light sources. In practical applications, the reflective lamp housing 40 may be a hollow rectangular box, a hollow trapezoid box, a hollow cone, a hollow pyramid, a hollow semi-sphere, or other geometric shapes. In this embodiment, the reflective lamp housing 40 has a semi-spherical shape. Besides, the first light source 100 and the second light source 200 are light emitting diodes and the exterior shape of the light sources may be spherical, long bar, or other geometric shapes. In this embodiment, the exterior shape of the first light source 100 and the second light source 200 is, but not limited to, a spherical shape. It is noted that the environment-detecting module 20 and the control module 30 are disposed adjacent to the light source module 10 and disposed on the reflective surface of the reflective lamp housing 40. However, in other embodiments, instead of being disposed on the reflective surface, the environment-detecting module 20 and the control module 30 may be, but not limited to, disposed on other surfaces of the reflective lamp housing 40.

Figure 3:
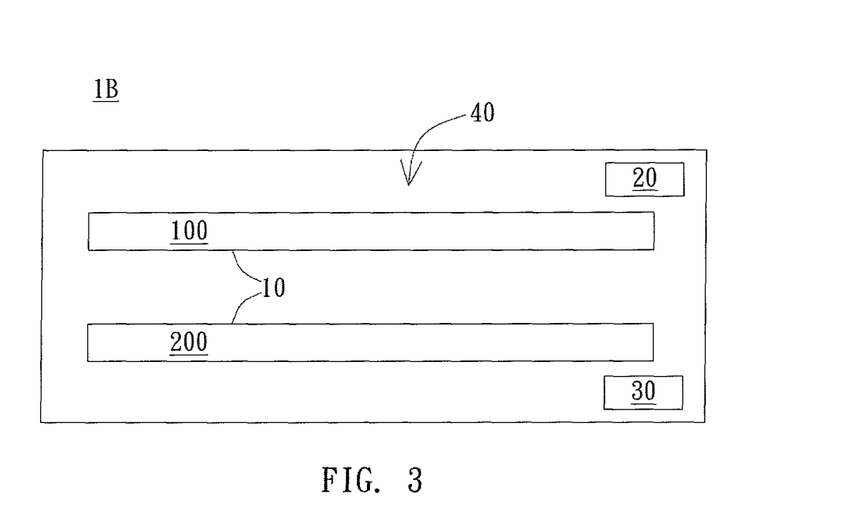
FIG. 3 is a top view of the first embodiment of the plant illumination apparatus.

Please refer to FIG. 3. FIG. 3 is a top view of the first embodiment of the plant illumination apparatus 1B. As shown in FIG. 3, the reflective lamp housing 40 of the plant illumination apparatus 1B is a hollow rectangular box, and the first light source 100 and the second light source 200 are disposed on the reflective surface of the reflective lamp housing 40. It is noted that the first light source 100 and the second light source 200 can be light bars having a plurality of light emitting diodes, traditional lamp tubes, or other light sources. In this embodiment, the first light source 100 and the second light source 200 are light bars having a plurality of light emitting diodes. In practical applications, the plant illumination apparatus 1B can be applied to large green houses, a site having several pot plants, a site having large plants, or other large fields.

The present invention will describe the function of automatically adjusting light sources of the plant illumination apparatus 1 by means of several embodiments.

Figure 4:
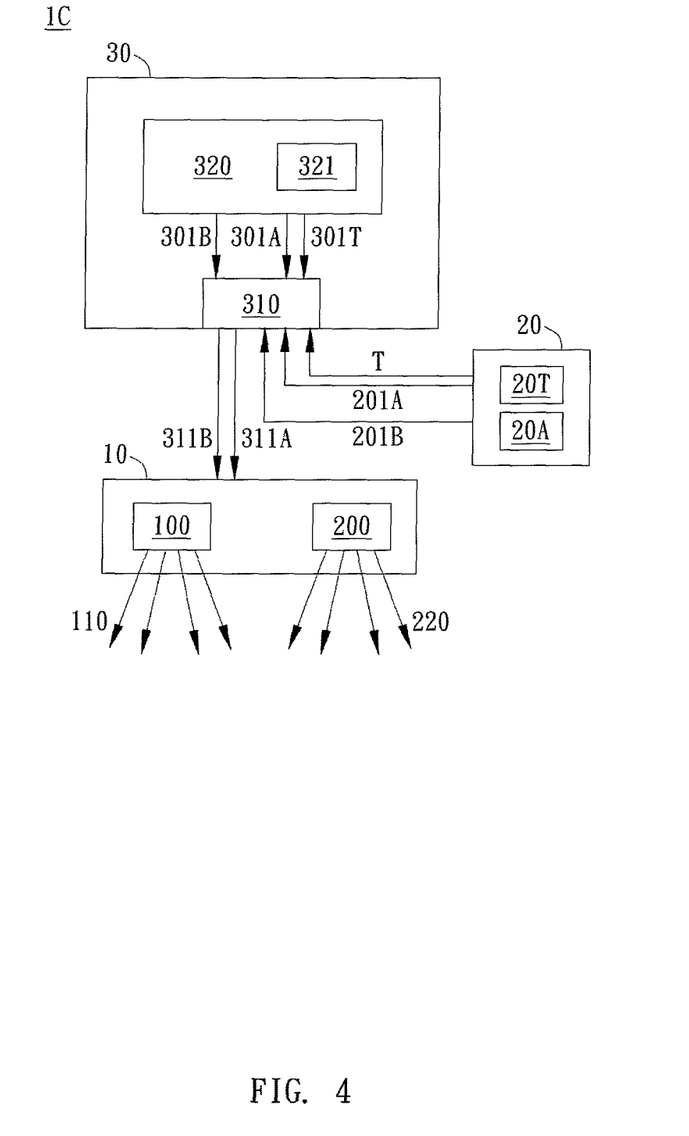
FIG. 4 is a schematic view of a second embodiment of the plant illumination apparatus.

Please refer to FIG. 4. FIG. 4 is a schematic view of a second embodiment of the plant illumination apparatus 1C. It is note that the plant illumination apparatus can detect environment parameters such as temperature, humidity, and luminous flux. For example, in this embodiment, the plant illumination apparatus 1C can detect temperature and luminous flux. As shown in FIG. 4, in this embodiment, the preset growing environment parameter 301 includes a preset temperature range 301T corresponding to the plant growth timing. The preset temperature range 301T is between T1 and T2, wherein the minimum value of the preset temperature is T1 and the maximum value of the preset temperature is T2. The preset growing environment parameter 301 further includes a preset high temperature threshold value T3, and T3 is larger than T2 (i.e. T3>T2).

Besides, the environment-detecting module 20 includes a temperature detector 20T, which detects an external environment to obtain a real-time temperature T. In practical applications, the control module 30 controls the first light source 100 and the second light source 200 of the light source module 10 according to the real-time temperature T.

Besides, the environment-detecting module 20 includes a light detector 20A, which detects an external environment to obtain an environment first wavelength luminous flux 201A and an environment second wavelength luminous flux 201B. In particular, the environment first wavelength luminous flux 201A and the environment second wavelength luminous flux 201B respectively are the luminance (energy) of light having the first wavelength 110 and the luminance (energy) of light having the second wavelength 220 detected by the light detector 20A.

In this embodiment, if the real-time temperature T is lower than T1, the control module 30 activates the second light source 200 of the light source module 10 to generate light having the second wavelength 220 and stops the first light source 100 generating light having the first wavelength 110. It is noted that when plant is in a low temperature environment, the plant is apt to absorb light having a wavelength between 400 nm and 500 nm (i.e. the second wavelength 220) and is not apt to absorb light having a wavelength between 600 nm and 700 nm (i.e. the first wavelength 110). That is, when the plant illumination apparatus 1C detects the ambient temperature lower than the minimum value of the preset temperature, the control module 30 activates the light source module 10 to generate light that plant is apt to absorb in low temperature and stops generating light that plant is not apt to absorb in low temperature.

Besides, if T2<T<T3, the control module 30 activates the first light source 100 of the light source module 10 to generate light having the first wavelength 100 and stops the second light source 200 generating light having the second wavelength 220. It is noted that when plant is in a high temperature environment, the plant is apt to absorb light having a wavelength between 600 nm and 700 nm (i.e. the first wavelength 110) and is not apt to absorb light having a wavelength between 400 nm and 500 nm (i.e. the second wavelength 220). That is, when the plant illumination apparatus 1C detects the ambient temperature higher than the maximum value of the preset temperature and lower than the preset high temperature threshold value, the control module 30 activates the light source module 10 to generate light that plant is apt to absorb in high temperature and stops generating light that plant is not apt to absorb in high temperature.

In practical situations, if the real-time temperature T is larger than or equal to the high temperature threshold value T3, the control module 30 stops the first light source 100 and the second light source 200 of the light source module 10. In other words, the temperature of plant will gradually decrease while stop illuminating with light having the first wavelength 110 and the second wavelength 220, so that the real-temperature T will approach to a proper temperature. In this design, light will be utilized effectively to achieve the promotion of plant growth and the effective utilization of energy.

TABLE 1 look-up table of preset growing environment parameters for plant

| | Preset growing environment parameters | Plant | | |
|---|---|---|---|---|
| | | long-day plant | short-day plant | neutral-day plant |
| Growth phase in spring | Total luminance flux (lm) | 2500 | 200 | 1000 |
| | 301A:301B | 10:3 | 10:3 | 10:3 |
| | first wavelength luminous flux parameter 301A (lm) | 1923 | 154 | 769 |
| | second wavelength luminous flux parameter 301B (lm) | 577 | 46 | 231 |
| | minimum value of preset temperature range T1 (° C.) | 25 | 10 | 10 |
| | maximum value of preset temperature range T2 (° C.) | 35 | 30 | 35 |
| | high temperature threshold value T3 (° C.) | 42 | 35 | 40 |
| Growth phase in summer | Total luminance flux (lm) | 3000 | 400 | 1000 |
| | 301A:301B | 10:2 | 10:2 | 10:2 |
| | first wavelength luminous flux parameter 301A (lm) | 2500 | 333 | 833 |
| | second wavelength luminous flux parameter 301B (lm) | 500 | 67 | 167 |
| | minimum value of preset temperature range T1 (° C.) | 25 | 15 | 15 |
| | maximum value of preset temperature range T2 (° C.) | 45 | 30 | 40 |
| | high temperature threshold value T3 (° C.) | 50 | 35 | 45 |
| Growth phase in fall | Total luminance flux (lm) | 2500 | 200 | 1000 |
| | 301A:301B | 10:3 | 10:3 | 10:3 |
| | first wavelength luminous flux parameter 301A (lm) | 1923 | 154 | 769 |
| | second wavelength luminous flux parameter 301B (lm) | 577 | 46 | 231 |
| | minimum value of preset temperature range T1 (° C.) | 25 | 15 | 15 |
| | maximum value of preset temperature range T2 (° C.) | 45 | 30 | 40 |
| | high temperature threshold value T3 (° C.) | 50 | 35 | 45 |
| Growth phase in winter | Total luminance flux (lm) | 500 | 100 | 100 |
| | 301A:301B | 10:4 | 10:4 | 10:4 |
| | first wavelength luminous flux parameter 301A (lm) | 357 | 71 | 71 |
| | second wavelength luminous flux parameter 301B (lm) | 143 | 29 | 29 |
| | minimum value of preset temperature range T1 (° C.) | 15 | 1 | 1 |
| | maximum value of preset temperature range T2 (° C.) | 30 | 25 | 30 |
| | high temperature threshold value T3 (° C.) | 37 | 30 | 35 |

For example, the database of plant growing environment parameters 321 stores preset growing environment parameters as shown in Table 1. Please refer to Table 1. Table 1 shows, but not limited to, preferable preset growing environment parameters for long-day plant, short-day plant, and neutral-day plant in different seasons. As shown in Table 1, the preferable growing temperature range for the long-day plant in spring is between 25° C. and 35° C. That is, T1 is 25° C. and T2 is 35° C. In this situation, the corresponding high temperature threshold value T3 is, but not limited to, 42° C. In practical situations, if the real-time temperature T is 20° C. (lower than T1, 25° C.), then the control module 30 activates the second light source 200 of the light source module 10 to generate light having the second wavelength 220 and stops the first light source 100 generating light having the first wavelength 110. As such, the real-time temperature T of the long-day plant will gradually increase because of continuous illumination with light having the second wavelength 220. Besides, when the real-time temperature T of plant rises to 30° C., the control module 30 activates the first light source 100 of the light source module 10 to generate light having the first wavelength 110 and stops the second light source 200 generating light having the second wavelength 220. As such, the real-time temperature T of the long-day plant will gradually increase because of continuous illumination with light having the first wavelength 110. However, once the real-time temperature T is equal to or higher than 45° C., the control module 30 stops the first light source 100 and the second light source 200 of the light source module 10, and thus the real-time temperature T will gradually decrease to approach a temperature between 25° C. and 35° C.

Particularly, when the real-time temperature T is between the minimum value of the preset temperature range T1 and the maximum value of the preset temperature range T2, the detailed operation of the control module 30 controlling the first light source 100 and the second light source 200 of the light source module 10 is shown in FIG. 4.

As shown in FIG. 4 and Table 1, the preset growing environment parameters 301 in the database of plant growing environment parameters 321 further include preset plant luminous parameters corresponding to the growth timing of plant. The preset plant luminous parameters include a first wavelength luminous flux parameter 301A, a second wavelength luminous flux parameter 301B, and a ratio of the first wavelength luminous flux parameter 301A to the second wavelength luminous flux parameter 301B. In this embodiment, the first wavelength luminous flux parameter 301A and the second wavelength luminous flux parameter 301B are the illumination energy of light having the first wavelength 110 and the illumination energy of light having the second wavelength 220 suitable for plant growth. The processor unit 310 compares the preset first wavelength luminous flux parameter 301A with the detected environment first wavelength luminous flux 201A to obtain a first wavelength luminous flux difference 311A. The processor unit 310 compares the preset second wavelength luminous flux parameter 301B with the detected environment second wavelength luminous flux 201B to obtain a second wavelength luminous flux difference 311B.

In practical situations, when the detected environment first wavelength luminous flux 201A is larger than or equal to the preset first wavelength luminous flux parameter 301A, the first wavelength luminous flux difference 311A is larger than or equal to 0 and the processor unit 310 stops the first light source 100 of the light source module 10 generating light having the first wavelength 110. In other words, plant is currently overexposed under the first wavelength 110, so that the environment first wavelength luminous flux 201A is larger than the illumination energy of light having the first wavelength 110, which is suitable for plant growth. Because the superfluous illumination energy does not achieve practical effect, the first light source 100 is stopped to decrease superfluous energy consumption. In contrast, when the detected environment first wavelength luminous flux 201A is smaller than the preset first wavelength luminous flux parameter 301A, the first wavelength luminous flux difference 311A is smaller than 0 and the processor unit 310 controls the first light source 100 of the light source module 10 to generate light having the first wavelength 110 for compensating the first wavelength luminous flux difference 311A. As such, plant receives the energy of light having the first wavelength 110 that can promote plant growth.

Besides, when the detected environment second wavelength luminous flux 201B is larger than or equal to the preset second wavelength luminous flux parameter 301B, the second wavelength luminous flux difference 311B is larger than or equal to 0 and the processor unit 310 stops the second light source 200 of the light source module 10 generating light having the second wavelength 220. In other words, plant is currently overexposed under the second wavelength 220, so that the environment second wavelength luminous flux 201B is larger than the illumination energy of the second wavelength 220, which is suitable for plant growth. Because the superfluous illumination energy does not achieve practical effect, the second light source 200 is stopped to decrease superfluous energy consumption. In contrast, when the detected environment second wavelength luminous flux 201B is smaller than the preset second wavelength luminous flux parameter 301B, the second wavelength luminous flux difference 311B is smaller than 0 and the processor unit 310 controls the second light source 200 of the light source module 10 to generate light having the second wavelength 220 for compensating the second wavelength luminous flux difference 311B. As such, plant receives the energy of light having the second wavelength 220 that can promote plant growth.

Please refer to Table 1. For example, in the situation of the growth timing of the long-day plant in spring, when the temperature detector 20T detects the real-time temperature T is between 25° C. and 35° C., which is the preferred growing temperature range in spring, the luminous flux of the first wavelength 110 and the second wavelength 220 for promoting the growth of the long-day plant is about 2500 lumen (lm). The ratio of the first wavelength luminous flux parameter 301A to the second wavelength luminous flux parameter 301B is 10:3. In other words, the ratio value of the first wavelength luminous flux parameter 301A to the second wavelength luminous flux parameter 301B is 3.33, wherein the first wavelength luminous flux parameter 301A is 1923 lm and the second wavelength luminous flux parameter 301B is 577 lm. That is, the long-day plant needs at least 1923 lm from light having the first wavelength 110 and 577 lm from light having the second wavelength 200.

If the detected environment first wavelength luminous flux 201A is 2000 lm, the first wavelength luminous flux difference 311A is 77 lm (larger than 0), the processor unit 310 stops the first light source 100 generating light having the first wavelength 110. At this time, plant has received sufficient light having the first wavelength 110 and the plant luminous apparatus 1C stops generating light having the first wavelength 110. If the detected environment first wavelength luminous flux 201A is 1850 lm, the first wavelength luminous flux difference 311A is −73 lm (smaller than 0), the processor unit 310 controls the first light source 100 of the light source module 10 to generate light having the the first wavelength 110 to compensate the first wavelength luminous flux difference 311A so that plant receives luminous flux of the first wavelength 110 that promotes plant growth.

Besides, if the detected environment second wavelength luminous flux 201B is 650 lm, the second wavelength luminous flux difference 311B is 73 lm (larger than 0), the processor unit 310 stops the second light source 200 generating light having the second wavelength 220. At this time, plant has received sufficient light having the second wavelength 220 and the plant luminous apparatus 1C stops generating light having the second wavelength 220. If the detected environment second wavelength luminous flux 201B is 500 lm, the second wavelength luminous flux difference 311B is −77 lm (smaller than 0), the processor unit 310 controls the second light source 200 of the light source module 10 to generate light having the second wavelength 220 to compensate the second wavelength luminous flux difference 311B so that plant receives luminous flux of the second wavelength 220 that promotes plant growth.

Figure 5:
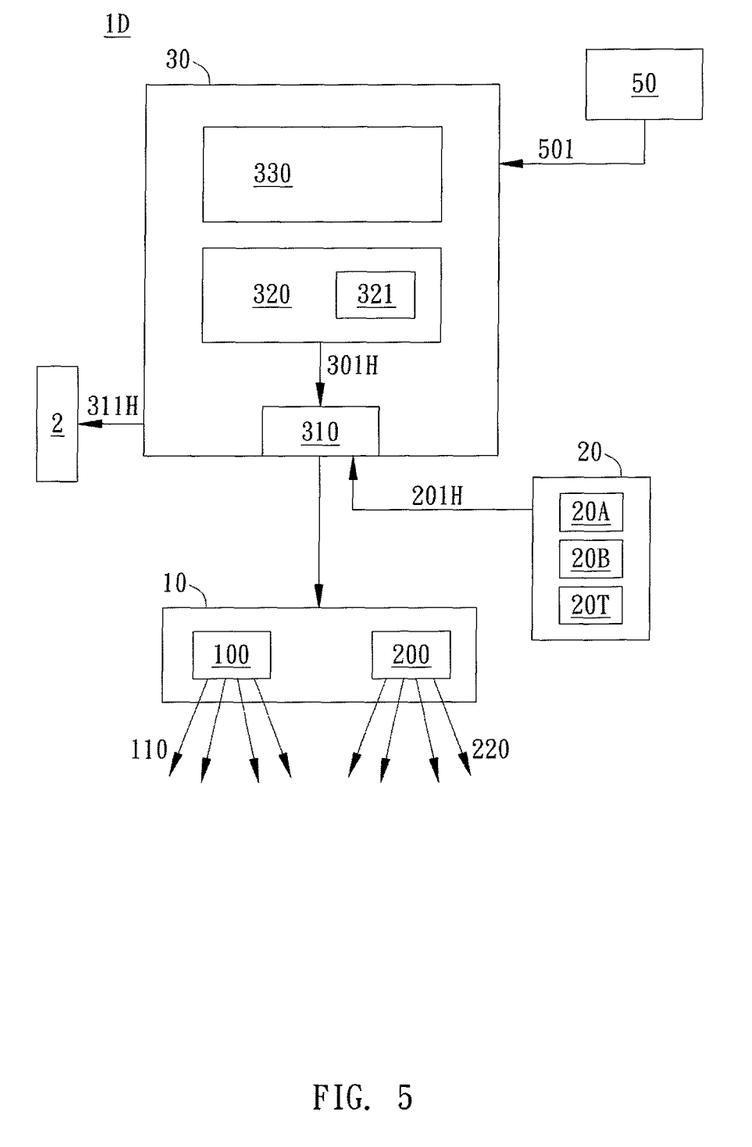
FIG. 5 is a schematic view of a third embodiment of the plant illumination apparatus.

Please refer to FIG. 5. FIG. 5 is a schematic view of a third embodiment of the plant illumination apparatus 1D. As shown in FIG. 5, the environment-detecting module 20 includes the temperature detector 20T and the light detector 20A and further includes a humidity detector 20B. The humidity detector 20B detects an external environment to obtain a real-time humidity 201H. It is noted that the preset growing environment parameters 301 in the database of plant growing environment parameters 321 includes a preset humidity 301H. In this embodiment, the control module 30 further includes a real-time clock unit 300 (RTC) to provide real time and the control module 30 can determine the corresponding plant growth timing based on the real time. In practical applications, the control module 30 adjusts plant growth timing by mans of the real-time clock unit 330 so as to allow the lighting effect of the first light source 110 and the second light source 220 to correspond to the plant growth timing.

Besides, as shown in FIG. 5, the control module 30 connects an external automatic sprinkler 2. When the real-time humidity 201H is lower than the preset humidity 301H, the control module 30 outputs an activation signal 311H to the external automatic sprinkler 2 to spray water automatically. In other words, the plant illumination apparatus 1D compares the real-time humidity 201H with the preset humidity 301H to turn on or turn off the external automatic sprinkler 2. In general situation, the traditional illumination apparatus that presets a sprinkle time or manually promotes the humidity of plant will lead to an incorrect control of water or a waste of labor force. Therefore, in this embodiment, the plant illumination apparatus 1D has effects of saving labor force and effectively controlling the amount of water.

In practical situations, the plant illumination apparatus 1D further includes a data input interface 50. The data input interface 50 connects the control module 30 so that the preset growing environment parameters 301 in the database of plant growing environment parameters 321 stored in the storage unit 320 of the control module 30 can be updated by the external command 501 inputted through the data input interface 50. In practical applications, the data input interface 50 is, but not limited to, an electronic connecting end interface, a keyboard interface, a wireless connecting interface, or other interfaces.

It is noted that the control module 30 determines the corresponding plant growth timing based on the real time of the real-time clock unit 330. The plant growth timing includes spring growth timing, summer growth timing, fall growth timing, and winter growth timing. For example, when the real time is in December, the control module 30 can determine the plant growth timing corresponding to winter growth timing and obtain a preset plant luminous parameter, which corresponds to winter growth timing. Please refer to Table 1. For the long-day plant, the winter growth timing has corresponding preset plant luminous parameters which include the first wavelength luminous flux parameter 301A of 357 lm, the second wavelength luminous flux parameter 301B of 143 lm, and the ratio of the first wavelength luminous flux parameter 301A to the second wavelength luminous flux parameter 301B of 2.5. In practical applications, after the corresponding plant growth timing being determined, the control module 30 outputs the preset plant luminous parameter to adjust the first light source 100 and the second light source 200.

In one alternative embodiment, the plant illumination apparatus adjusts the first light source 100 and the second light source 200 according to the real time of the real-time clock unit and the preset temperature range. Please refer to Table 1. In practical applications, the control module 30 obtains the plant growth timing from the real time and obtains the preset temperature range from the database of the plant growing environment parameters so that the control module 30 can adjust the first light source 100 and the second light source 200 by means of the corresponding preset plant luminous parameter. Especially for the great seasonal variation in recent years, the plant illumination apparatus may achieve the optimum illumination effect through the aforementioned parameters.

Comparing to prior arts, the plant illumination apparatus of the present invention utilizes environment-detecting module to obtain environment parameters. The control module compares the environment parameters with the preset parameters of the database of plant growing environment parameters to control the first light source and the second light source for promoting plant growth. In practical applications, the plant illumination apparatus turns on or turns off the light sources based on the external environment to immediately adjust the illumination and effectively save energy, so that an ideal plant growth environment can be provided.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A plant illumination apparatus, comprising:
   a light source module comprising a first light source generating a first wavelength light and a second light source generating a second wavelength light;
   an environment-detecting module detecting an external environment to obtain a real-time environment parameter; and
   a control module connected to the light source module and the environment-detecting module, wherein the control module comprises a processor unit and a storage unit storing a database of plant growing environment parameters;
   wherein the processor unit loads at least one preset growing environment parameter required for plant growth timing from the database of plant growing environment parameters, compares the preset growing environment parameter with the real-time environment parameter to output at least one comparison result, and adjusts the first light source and the second light source according to the comparison result to obtain an adjusted environment parameter that matches the preset growing environment parameter.

2. The plant illumination apparatus of claim 1, wherein the real-time environment parameter comprises at least one of a real-time temperature, an environment first wavelength luminous flux, and an environment second wavelength luminous flux; the preset growing environment parameter comprises a preset temperature range corresponding to the plant growth timing, a preset high temperature threshold value T3, and a preset plant luminous parameter, wherein a minimum value of the preset temperature range is T1, a maximum value of the preset temperature range is T2; and T3>T2.

3. The plant illumination apparatus of claim 2, wherein the environment-detecting module comprises a temperature detector detecting the external environment to obtain the real-time temperature T.

4. The plant illumination apparatus of claim 3, wherein if the real-time temperature T is lower than T1, the control module drives the second light source of the light source module to generate the second wavelength light and drives the first light source of the light source module to stop generating the first wavelength light; or if T2<T<T3, the control module drives the first light source of the light source module to generate the first wavelength light and drives the second light source of the light source module to stop generating the second wavelength light; or if the real-time temperature T is larger than or equal to the high temperature threshold value T3, the control module drives the first light source and the second light source of the light source module to stop generating the light.

5. The plant illumination apparatus of claim 2, wherein the environment-detecting module comprises a light detector detecting the external environment to obtain the environment first wavelength luminous flux and the environment second wavelength luminous flux.

6. The plant illumination apparatus of claim 5, wherein the preset plant luminous parameter comprises at least one of a first wavelength luminous flux parameter, a second wavelength luminous flux parameter, and a ratio of the first wavelength luminous flux parameter to the second wavelength luminous flux parameter.

7. The plant illumination apparatus of claim 6, wherein the processor unit compares the first wavelength luminous flux parameter with the detected environment first wavelength luminous flux to determine a first wavelength luminous flux difference; and the processor unit compares the second wavelength luminous flux parameter with the detected environment second wavelength luminous flux to determine a second wavelength luminous flux difference.

8. The plant illumination apparatus of claim 7, wherein the processor unit controls the first light source of the light source module to stop generating the first wavelength light when the first wavelength luminous flux difference is large than or equal to 0; or the processor unit controls the second light source of the light source module to stop generating the second wavelength light when the second wavelength luminous flux difference is large than or equal to 0; or the processor unit controls the first light source of the light source module to generate the first wavelength light for compensating the first wavelength luminous flux difference when the first wavelength luminous flux difference is less than 0; or the processor unit controls the second light source of the light source module to generate the second wavelength light for compensating the second wavelength luminous flux difference when the second wavelength luminous flux difference is less than 0.

9. The plant illumination apparatus of claim 7, wherein the preset plant luminous parameter is classified into groups according to different temperature range.

10. The plant illumination apparatus of claim 1, wherein the control module further comprises a real-time clock unit for providing a real time, wherein the control module determines the plant growth timing according to the real time.

11. The plant illumination apparatus of claim 1, wherein the real-time environment parameter further comprises a real-time humidity; the preset growing environment parameter comprises a preset humidity; the environment-detecting module comprises a humidity detector detecting the external environment to obtain the real-time humidity.

12. The plant illumination apparatus of claim 11, wherein the control module is connected to an external automatic sprinkler, wherein the control system outputs an activation signal to the external automatic sprinkler for automatically spray water when the real-time humidity is lower than the preset humidity.

13. The plant illumination apparatus of claim 1, further comprising a data input interface connected to the control module, wherein the preset growing environment parameter of the database of plant growing environment parameters of the storage unit is updated by an external command inputted through the data input interface.

14. The plant illumination apparatus of claim 1, wherein the first wavelength is between 600 nm and 700 nm, and the second wavelength is between 395 nm and 500 nm.

* * * * *